(12) United States Patent
Drossel et al.

(10) Patent No.: US 8,816,871 B2
(45) Date of Patent: Aug. 26, 2014

(54) METHOD FOR MONITORING A STATIC AND/OR DYNAMIC STABILITY OF A WIND TURBINE

(75) Inventors: Detlef Drossel, Norderstedt (DE); Ulrich Harms, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 217 days.

(21) Appl. No.: 13/310,345

(22) Filed: Dec. 2, 2011

(65) Prior Publication Data

US 2012/0139740 A1 Jun. 7, 2012

(30) Foreign Application Priority Data

Dec. 4, 2010 (DE) .......................... 10 2010 053 523

(51) Int. Cl.
*G08B 21/00* (2006.01)
(52) U.S. Cl.
USPC ................................ 340/658; 290/44; 290/55
(58) Field of Classification Search
USPC ............... 340/658; 290/44, 55; 416/5, 12, 17;
73/147, 455, 456, 460, 579
See application file for complete search history.

(56) References Cited

U.S. PATENT DOCUMENTS

| 4,266,911 | A | 5/1981 | Helm et al. |
| 6,525,518 | B1* | 2/2003 | Garnaes .................... 324/76.13 |
| 6,891,280 | B2 | 5/2005 | Siegfriedsen |
| 7,309,930 | B2 | 12/2007 | Suryanarayanan et al. |
| 7,400,055 | B2 | 7/2008 | Nagao |
| 7,423,352 | B2 | 9/2008 | Suryanarayanan et al. |
| 7,708,524 | B2 | 5/2010 | Sundermann et al. |
| 7,919,880 | B2* | 4/2011 | Nielsen et al. .................. 290/44 |
| 8,021,110 | B2* | 9/2011 | Kerber .............................. 416/1 |
| 8,044,670 | B2 | 10/2011 | Bjerge et al. |
| 8,474,500 | B2* | 7/2013 | Caretta et al. ................. 152/509 |
| 2004/0108729 | A1* | 6/2004 | Wobben .......................... 290/44 |
| 2006/0066111 | A1* | 3/2006 | Suryanarayanan et al. .... 290/44 |
| 2007/0146133 | A1* | 6/2007 | Wehrenberg ............... 340/568.1 |
| 2009/0039650 | A1* | 2/2009 | Nies ................................ 290/44 |

(Continued)

FOREIGN PATENT DOCUMENTS

| DE | 197 39 164 A1 | 3/1999 |
| DE | 202 21 562 U1 | 5/2006 |
| EP | 2 063 110 A1 | 5/2009 |

OTHER PUBLICATIONS

Ciang C., et al, "Structural health monitoring for a wind turbine system: a review of damage detection methods", Measurement Science and Technology 19 (2008) 122001, pp. 1 to 20, IOP Publishing Ltd.

(Continued)

*Primary Examiner* — Brian Zimmerman
*Assistant Examiner* — An T Nguyen
(74) *Attorney, Agent, or Firm* — Walter Ottesen P.A.

(57) ABSTRACT

The invention relates to a method for monitoring a static and/or dynamic stability of a wind turbine. The wind turbine has a tower, a nacelle, which is supported by the tower, and a rotor, which is mounted in or on the nacelle and has at least one rotor blade which can be adjusted about its longitudinal axis. The method includes the following steps: the wind turbine is excited to oscillate in at least one direction. A frequency ($f_m$) of the excited oscillation is detected. The detected frequency is compared with a predetermined frequency ($f_{ref}$) and an alarm signal is generated if the detected frequency deviates from the predetermined frequency by more than a difference value ($\Delta f$).

9 Claims, 3 Drawing Sheets

(56) References Cited

U.S. PATENT DOCUMENTS

| | | |
|---|---|---|
| 2009/0185901 A1* | 7/2009 | Nielsen et al. .................... 416/1 |
| 2009/0200804 A1* | 8/2009 | Nielsen et al. ................... 290/44 |
| 2010/0066555 A1* | 3/2010 | Gram-Hansen et al. ...... 340/679 |
| 2010/0289266 A1 | 11/2010 | Wortmann et al. |
| 2011/0125419 A1* | 5/2011 | Bechhoefer et al. ............ 702/34 |
| 2011/0148110 A1* | 6/2011 | Egedal et al. ................... 290/44 |
| 2012/0139740 A1* | 6/2012 | Drossel et al. ................. 340/658 |

OTHER PUBLICATIONS

English translation and the Office action of the German Patent Office dated May 13, 2014 in German patent application 10 2010 053 523.0 on which the claim of priority is based.

* cited by examiner

METHOD FOR MONITORING A STATIC AND/OR DYNAMIC STABILITY OF A WIND TURBINE

CROSS REFERENCE TO RELATED APPLICATION

This application claims priority of German patent application no. 10 2010 053 523.0, filed Dec. 4, 2010, the entire content of which is incorporated herein by reference.

FIELD OF THE INVENTION

The present invention relates to a method for monitoring a static and/or dynamic stability of a wind turbine.

BACKGROUND OF THE INVENTION

DE 202 21 562 U1 discloses a wind turbine with a tower oscillation monitoring. The wind turbine is equipped with a control device for the control system of the wind turbine, and with a device for detection of the oscillation movement of the tower. The wind turbine is equipped with means for detecting an oscillation of the tower. If it is found that the tower oscillation and/or the absolute deflection of the tower exceed/exceeds a predeterminable first threshold value, the control system is changed to prevent a further excitation of the tower oscillation. It is also known for the first natural frequency of the tower to be measured with the aid of the means for detection of the tower oscillation.

U.S. Pat. No. 8,044,670 discloses a method for determining the first tower natural frequency. For this purpose, measured acceleration values are evaluated with the aid of a Fourier transformation, and the tower natural frequencies are determined using a spectral vector.

EP 2 063 110 A1 discloses a method for damping oscillations at the tower of a wind turbine. For this purpose, the rotor rotational speed is modified by changing the blade pitch angle depending on a tower oscillation.

U.S. patent application publication 2010/0289266 discloses a method for operating a wind turbine, in which the blade pitch angle for each rotor blade is changed as a function of a lateral oscillation of the tower in order to damp the lateral oscillation of the tower induced by the external wind movement.

U.S. Pat. No. 4,266,911 discloses a method for the installation of a wind turbine in which a tower is supported during installation by guyed cables such that its first natural oscillation frequency is not excited while the nacelle is being fitted.

DE 197 39 164 B4 discloses a wind turbine having a rotor in which a yaw and/or pitch actual moment exerted on the rotor is detected, and is reduced by adjusting the blade pitch angle.

U.S. Pat. No. 7,708,524 discloses a method for identification of a lateral tower acceleration, which is used for identification of asymmetric ice accumulation on the rotor blades. For this purpose, the lateral acceleration of the tower is compared with the frequency of the rotor blades.

U.S. Pat. No. 7,423,352 discloses a method for damping oscillations of a wind turbine in which the generator torque is regulated as a function of the generator rotational speed and a resonant frequency.

U.S. Pat. No. 7,400,055 discloses a wind turbine in which a lateral tower oscillation is measured and is damped by regulating the torque of the generator and the blade pitch angle.

U.S. Pat. No. 6,891,280 discloses a method for operating an offshore wind turbine in which a rotational speed which can lead to excitation of the critical tower natural frequency is prevented by an open-loop control of the wind turbine.

SUMMARY OF THE INVENTION

It is an object of the invention to provide a method for monitoring a static and/or dynamic stability of a wind turbine which reliably identifies faults and changes in the stability using means which are as simple as possible.

The method of the invention is for monitoring a static and/or dynamic stability of a wind turbine having a tower, a nacelle which is supported by the tower, and a rotor which is mounted in or on the nacelle and has at least one rotor blade which can be adjusted about its longitudinal axis. The method includes the steps of: exciting the wind turbine to oscillate in at least one direction; detecting a frequency $f_m$ of the excited oscillation; comparing the detected frequency with a predetermined frequency $f_{ref}$; and, generating an alarm signal when the detected frequency deviates from the predetermined frequency by more than a difference value $\Delta f$.

The method according to the invention is used for monitoring a static and/or dynamic stability of a wind turbine. The wind turbine has a tower, a nacelle, which is supported by the tower, and a rotor, which is mounted in or on the nacelle and has rotor blades which can be adjusted about their longitudinal axis.

According to the invention, the following method steps are provided:

In a first step, the wind turbine is excited to oscillate in at least one direction. In a second, subsequent step, a frequency of the oscillation which is excited in the wind turbine is detected. In a third step, the detected frequency is compared with a predetermined frequency. In a fourth step, an alarm signal is generated if the detected frequency differs from a predetermined frequency by more than a difference value. The invention is based on the realization that changing the static and/or dynamic stability of the wind turbine leads to a change in a natural frequency of the wind turbine. The method according to the invention therefore provides for a natural frequency of the wind turbine to be measured during an oscillation, and for the measured frequency to be compared with a predetermined frequency. This makes it possible to determine whether changes have occurred in the stability of the wind turbine and in particular its tower. A change in the stability of the wind turbine necessarily leads to a change in the frequency at which the wind turbine reacts to an oscillation that is excited. In contrast to the methods known from the prior art, which use a measured natural frequency for the control system of the wind turbine, the method according to the invention involves a measured frequency being used to check the stability of the wind turbine and an alarm signal, which indicates changes in the stability of the wind turbine being produced independently of the control system of the wind turbine and the parameters predetermined by the control system.

In one preferred refinement of the method according to the invention, the blade pitch angle of at least one rotor blade is adjusted, thus changing the thrust force acting on the wind turbine, and therefore causing the tower to oscillate. The oscillation therefore takes place mainly in the direction at right angles to the area covered by the rotor blade. The frequency of the oscillation of the wind turbine excited in this way is detected and evaluated in the method according to the invention.

In one preferred refinement, the blade pitch angle is adjusted through at least one predetermined angle, for example 45°, in order to cause the oscillation. The rotor blade is preferably adjusted completely to its feathered position.

Preferably, not only the blade pitch angle of one rotor blade is adjusted, but the blade pitch angles of all the rotor blades are adjusted at the same time in order to cause oscillation of the wind turbine in reproducible manner.

In order to cause the wind turbine together with its tower to oscillate adequately, a predetermined blade pitch adjustment rate for changing the blade pitch angle is selected which is sufficiently high to cause the tower to oscillate at an amplitude which allows evaluation.

An acceleration sensor which is arranged in the nacelle is preferably used for detecting the frequency of the oscillation which is excited in the wind turbine. The acceleration values for the nacelle, detected by the acceleration sensor, are converted in a manner known per se to an oscillation frequency. During the process, the detected frequency may be low-pass filtered to suppress disturbance influences.

The predetermined frequency with which the detected frequency is compared is preferably the first tower natural frequency. The tower natural frequencies of the wind turbine are known very precisely from theoretical calculation as a result of which a difference between the detected frequency and a tower natural frequency calculated in advance provides an indication that the actual stability of the wind turbine differs from the expected stability.

The method according to the invention preferably provides for an ala it signal to be generated only if the detected frequency differs from the predetermined frequency by more than a predetermined difference. A first difference value, by which the detected frequency may be greater than the predetermined frequency, and a second difference value, by which the detected frequency may be less than the predetermined frequency, are preferably provided for this purpose.

In one preferred refinement, the alarm signal is likewise generated if the detected frequency is separated by less than a minimum amount from a predetermined excitation frequency, for example a 1P or 3P excitation frequency. The 1P excitation occurs, for example, as a result of unbalances. The 3P excitation denotes the excitation of the wind turbine by the movement of the three rotor blades as a result of a nonuniform wind speed distribution which, for example, may be caused by the tower, gusts, height gradients in the wind speed and oblique incident flow.

In order to ensure reliable evaluation of the detected frequency, the amplitude of the oscillation which is excited is also detected, and an alarm signal is generated only if the amplitude is greater than a predetermined minimum value. In this refinement of the method, those oscillations which have not led to a sufficiently large amplitude deflection during the tower oscillation are rejected.

BRIEF DESCRIPTION OF THE DRAWINGS

The invention will now be described with reference to the drawings wherein:

FIG. 1 *b* shows a time profile of a tower oscillation;

DESCRIPTION OF THE PREFERRED
EMBODIMENTS OF THE INVENTION

Figure 1:
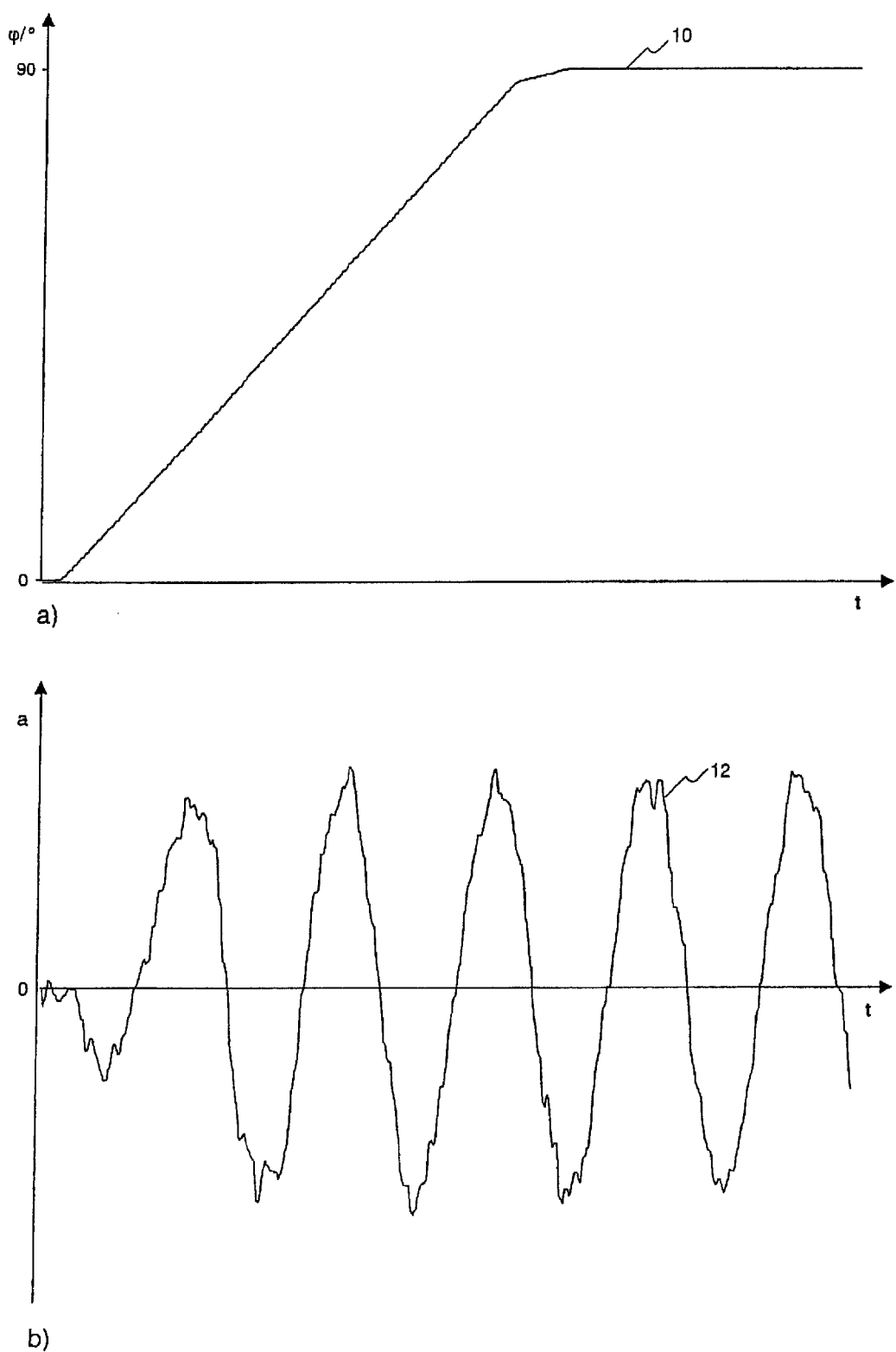
FIG. 1 *a* shows a time profile of the adjustment of the pitch angle.

FIGS. 1 *a* and *b* show the oscillation which is excited in a wind turbine, in each case in the form of a graph plotted as a function of the time t. FIG. 1 *a* shows the adjustment of the blade pitch angle 10 as a function of time. The wind turbine is excited to oscillate in the Z direction by rapid adjustment from a small blade pitch angle of about 0° to a blade pitch angle of about 90°. In this case, the Z direction is that direction which is at right angles to the plane covered by the rotor blades. The oscillation is recorded using an acceleration sensor, whose acceleration values are shown as the curve 12 in FIG. 1 *b*. This results in an oscillation which is similar to a sinusoidal oscillation and which is plotted as a function of the time t. In order to obtain a valid frequency value, the signal 12 is subjected to low-pass filtering. This ensures that high-frequency fluctuations in the acceleration signal 12 are suppressed. The process also ensures that the amplitude values of the detected acceleration values 12 are sufficiently high to allow evaluation. For this purpose, it is possible to define that a minimum value for the magnitude of an amplitude value must be exceeded. In order to preclude faults, it is also possible to provide that a maximum value for the magnitude of an amplitude value must not be exceeded either.

Figure 2:
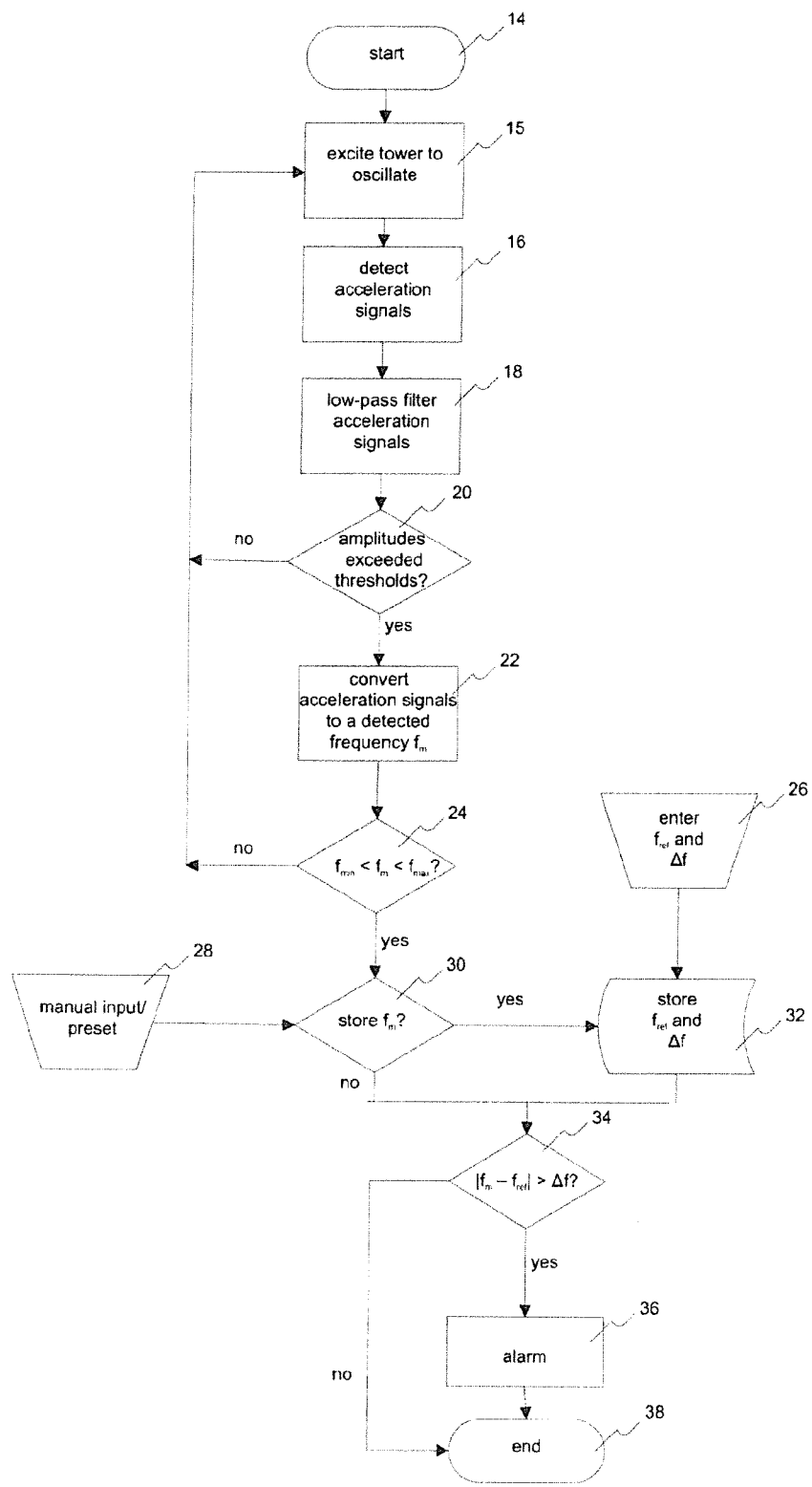
FIG. 2 shows a flowchart for evaluating the detected acceleration signals.

FIG. 2 shows the procedure for initiating the alarm signal in the method according to the invention. The method starts with step 14. In step 15, the tower of the wind turbine is excited to oscillate. The acceleration signals are detected in step 16, and are low-pass filtered in a further step 18. In a subsequent decision block 20, the filtered acceleration signals are checked to determine whether they can be evaluated. Here, a check is carried out to determine whether the maximum amplitude has exceeded a predetermined first threshold value. In the situation when the maximum value of the amplitude has exceeded the threshold value, a check is then carried out to determine whether the minimum value of the amplitude has fallen below a lower threshold value. If both conditions are satisfied, the value meets the requirements, and can be processed further in step 22. Otherwise, another oscillation of the tower of the wind turbine is excited in step 15.

In step 22, the detected acceleration signals are converted to a detected frequency $f_m$. In the process, the frequency is determined as the reciprocal of the period length of the detected signals, in a manner known per se. In this refinement, there is no need for a Fourier transformation and a complex Fourier analysis of the signals. A check is carried out in a subsequent step 24 to determine whether the detected frequency $f_m$ is less than a predetermined maximum frequency, and whether the detected frequency $f_m$ is greater than a predetermined minimum frequency. This allows detected frequencies which are obviously not based on a tower natural oscillation to be excluded from further processing. If the detected value $f_m$ meets the requirements, then a decision is made in step 30 as to whether the value should be stored in step 32. This decision is dependent on a manual input or appropriate presetting in step 28. Then, in step 34, the magnitude of the difference between the present frequency values $f_m$ and $f_{ref}$ is compared with a predetermined difference value $\Delta f$. The values for $f_{ref}$ and of are entered in step 26, or are already stored. If the frequency values $f_m$ and $f_{ref}$ differ from one another by more than a predetermined difference value $\Delta f$, then an alarm is triggered in step 36. Otherwise, no alarm is triggered in step 36, and the program processing is ended. By way of example, if the first tower natural frequency for a tower is f=0.3 Hz, then the predetermined difference value $\Delta f$ may be set, for example, to +/−5% of the first tower natural frequency, that is to say Δf=15 mHz.

The frequency of the 1P excitation is in this case obtained from the rotational speed divided by 60, since the rotational speed is normally quoted in revolutions per minute, and the frequency is quoted in oscillations per second. The 3P excitation, which occurs in particular in the event of nonuniform wind strengths, is three times the 1P excitation. In step 34, the detected frequency $f_m$ can additionally be compared with the frequencies of the 1P and 3P excitations, in order in this way to produce an alarm signal if the actual tower natural frequency is separated from the 1P or 3P excitation frequency by less than a predetermined amount.

In FIG. 2, the predetermined frequency $f_{ref}$, for example a tower natural frequency calculated in advance, is stored in step 32. Alternatively, it is also possible to store one of the most recently measured tower natural frequencies, or a mean value of these tower natural frequencies, in step 32 in order in this way to carry out a comparison with respect to the most recently detected frequency $f_m$.

Figure 3:
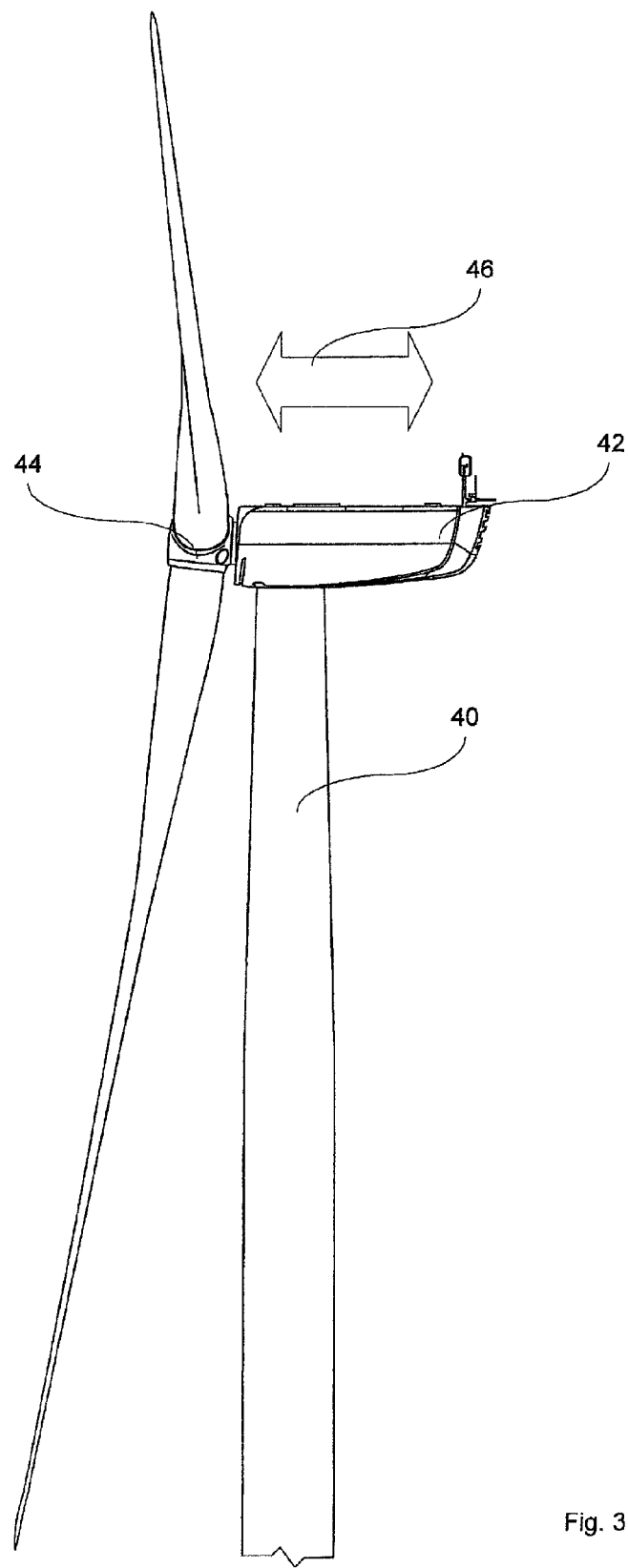
FIG. 3 shows a schematic side elevation view of a wind turbine.

FIG. 3 shows a schematic view of a wind turbine from the side. The wind turbine has a tower 40, which is fitted with a nacelle 42 at its upper end. The lower end of the tower 40 is anchored on a foundation (not shown), which may be a foundation anchored on land or offshore. The rotor together with its rotor blades is mounted on the nacelle 42. The rotor 44 has three rotor blades, two of which can be seen in the side view. The oscillations produced by rapid adjustment of the blade pitch angle lead to a movement of the nacelle 42 essentially at right angles to the plane covered by the rotor blades, along the double-headed arrow 46. The oscillation direction 46 may have further, relatively small oscillation amplitudes superimposed on it, as a result of which the movement of the nacelle is not necessarily one-dimensional in the direction of the double-headed arrow 46, but may also have lateral oscillations with a relatively small lateral amplitude.

It is understood that the foregoing description is that of the preferred embodiments of the invention and that various changes and modifications may be made thereto without departing from the spirit and scope of the invention as defined in the appended claims.

What is claimed is:

1. A method for monitoring a static and/or dynamic stability of a wind turbine having a tower, a nacelle which is supported by the tower, and a rotor which is mounted in or on the nacelle and has at least one rotor blade defining a plane as the rotor blade rotates over an area and said rotor blade being adjustable about its longitudinal axis, the method comprising the steps of:

exciting the wind turbine to oscillate with said tower thereof in a z-direction at right angles to said plane by adjusting a blade pitch angle of said at least one rotor blade to its feathered position;

detecting a frequency ($f_m$) of the excited oscillation of said wind turbine including said tower;

comparing the detected frequency with a predetermined frequency ($f_{ref}$); and, generating an alarm signal when the detected frequency deviates from the predetermined frequency by more than a difference value (Δf).

2. The method of claim 1, wherein the blade pitch angle is adjusted by at least a predetermined angle.

3. The method of claim 1, wherein the at least one rotor blade is adjusted at a predetermined blade pitch adjustment rate, which is selected to be sufficiently high that the tower is excited to oscillate.

4. The method of claim 1, wherein the frequency of the excited oscillation is detected by evaluating a sensor signal from an acceleration sensor arranged in the nacelle.

5. The method of claim 1, wherein the detected frequency is low-pass filtered.

6. The method of claim 1, wherein a first tower natural frequency is provided as the predetermined frequency.

7. The method of claim 1, wherein the alarm signal is generated if the detected frequency is greater than the predetermined frequency by more than a first difference value or is less than the predetermined frequency by more than a second difference value.

8. The method of claim 1, wherein the alarm signal is generated when the detected frequency drops below a predetermined excitation frequency by more than a minimum amount.

9. The method of claim 1, wherein an amplitude of the excited oscillation is detected and the alarm signal is generated only if the amplitude exceeds a predetermined minimum value.

\* \* \* \* \*

UNITED STATES PATENT AND TRADEMARK OFFICE
CERTIFICATE OF CORRECTION

PATENT NO.         : 8,816,871 B2                                   Page 1 of 1
APPLICATION NO.    : 13/310345
DATED              : August 26, 2014
INVENTOR(S)        : Detlef Drossel and Ulrich Harms It is certified that error appears in the above-identified patent and that said Letters Patent is hereby corrected as shown below:

In the Specification

Column 3:
Line 31: delete "ala it" and insert -- alarm -- therefor.

Column 4:
Line 61: delete "of" and insert -- $\Delta f$ -- therefor.

Signed and Sealed this
Sixteenth Day of December, 2014

Michelle K. Lee
*Deputy Director of the United States Patent and Trademark Office*